United States Patent
Avey et al.

(10) Patent No.: US 12,258,950 B2
(45) Date of Patent: Mar. 25, 2025

(54) OPEN CHANNEL PLUNGER FOR FRACKING PUMPS

(71) Applicant: GD Energy Products, LLC, Tulsa, OK (US)

(72) Inventors: Adam Bradley Avey, Tulsa, OK (US); James Robert Yanus, Tulsa, OK (US)

(73) Assignee: GD Energy Products, LLC, Tulsa, OK (US)

( * ) Notice: Subject to any disclaimer, the term of this patent is extended or adjusted under 35 U.S.C. 154(b) by 73 days.

(21) Appl. No.: 18/096,180

(22) Filed: Jan. 12, 2023

(65) Prior Publication Data

US 2024/0240626 A1     Jul. 18, 2024

(51) Int. Cl.

| | |
|---|---|
| F04B 19/22 | (2006.01) |
| E21B 43/26 | (2006.01) |
| F04B 39/00 | (2006.01) |
| F04B 53/14 | (2006.01) |
| F04B 53/20 | (2006.01) |
| F15B 15/14 | (2006.01) |
| F16J 1/08 | (2006.01) |

(52) U.S. Cl.
CPC ............. *F04B 19/22* (2013.01); *F04B 53/20* (2013.01); *E21B 43/2607* (2020.05); *F04B 39/0005* (2013.01); *F04B 53/14* (2013.01); *F15B 15/1466* (2013.01); *F16J 1/08* (2013.01)

(58) Field of Classification Search
CPC ...... F04B 19/22; F04B 53/20; F04B 39/0005; F04B 53/14; E21B 43/2607; F15B 15/1466; F16J 1/08; F16J 1/005; F16J 1/006
See application file for complete search history.

(56) References Cited

U.S. PATENT DOCUMENTS

| | | | | |
|---|---|---|---|---|
| 1,741,643 | A | * 12/1929 | Mcclure | F04B 53/14 |
| | | | | 92/248 |
| 2,899,936 | A | * 8/1959 | Edmund | F16J 1/006 |
| | | | | 92/143 |
| 3,887,305 | A | 6/1975 | Ito | |
| 4,174,194 | A | * 11/1979 | Hammelmann | F04B 19/022 |
| | | | | 417/457 |
| 8,590,614 | B2 | 11/2013 | Surjaatmadja et al. | |

(Continued)

FOREIGN PATENT DOCUMENTS

| | | |
|---|---|---|
| CN | 203023042 U | 6/2013 |
| CN | 204212972 U * | 3/2015 |

(Continued)

OTHER PUBLICATIONS

CN204212972U translation (Year: 2024).*
Engineeringtoolbox.com; Solids—Densities, engineeringtoolbox.com/density-solids-d_1265.html (Year: 2024).*

*Primary Examiner* — David N Brandt
(74) *Attorney, Agent, or Firm* — Edell, Shapiro & Finnan, LLC

(57) ABSTRACT

A light-weight reciprocating element is disclosed. The reciprocating element may include a body defining a cavity, the body having a closed distal end and an open proximal end opposite the closed distal end, wherein the body is configured to apply a pressure to a working fluid. The cavity extends from the open proximal end towards the closed distal end. The reciprocating element may include an insert disposed in the cavity, the insert is configured to prevent debris from accumulating within the cavity.

17 Claims, 5 Drawing Sheets

(56) References Cited

U.S. PATENT DOCUMENTS

| | | |
|---|---|---|
| 9,849,482 B2 | 12/2017 | Wykydal |
| 11,261,863 B2 | 3/2022 | Beisel et al. |
| 11,441,687 B2 | 9/2022 | Hurst et al. |
| 2014/0127036 A1 | 5/2014 | Buckley et al. |
| 2015/0132157 A1* | 5/2015 | Whaley .................. F04B 47/12 92/172 |
| 2020/0362851 A1 | 11/2020 | Beisel et al. |
| 2020/0362853 A1 | 11/2020 | Hurst et al. |
| 2020/0362856 A1 | 11/2020 | Hurst et al. |
| 2020/0362859 A1 | 11/2020 | Hurst et al. |
| 2022/0154704 A1 | 5/2022 | Beisel et al. |

FOREIGN PATENT DOCUMENTS

| | | |
|---|---|---|
| CN | 204402834 U | 6/2015 |
| CN | 106499625 B | 5/2018 |
| EP | 0580196 B1 | 8/1996 |
| EP | 1336756 B1 | 1/2003 |

\* cited by examiner

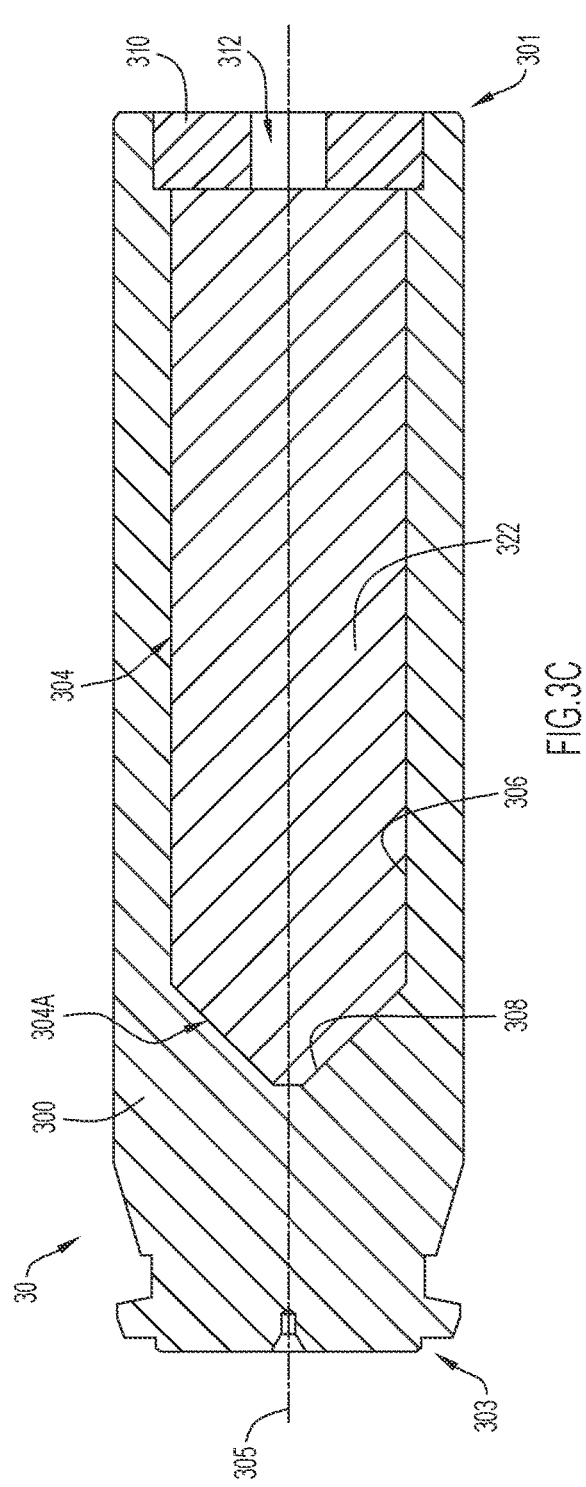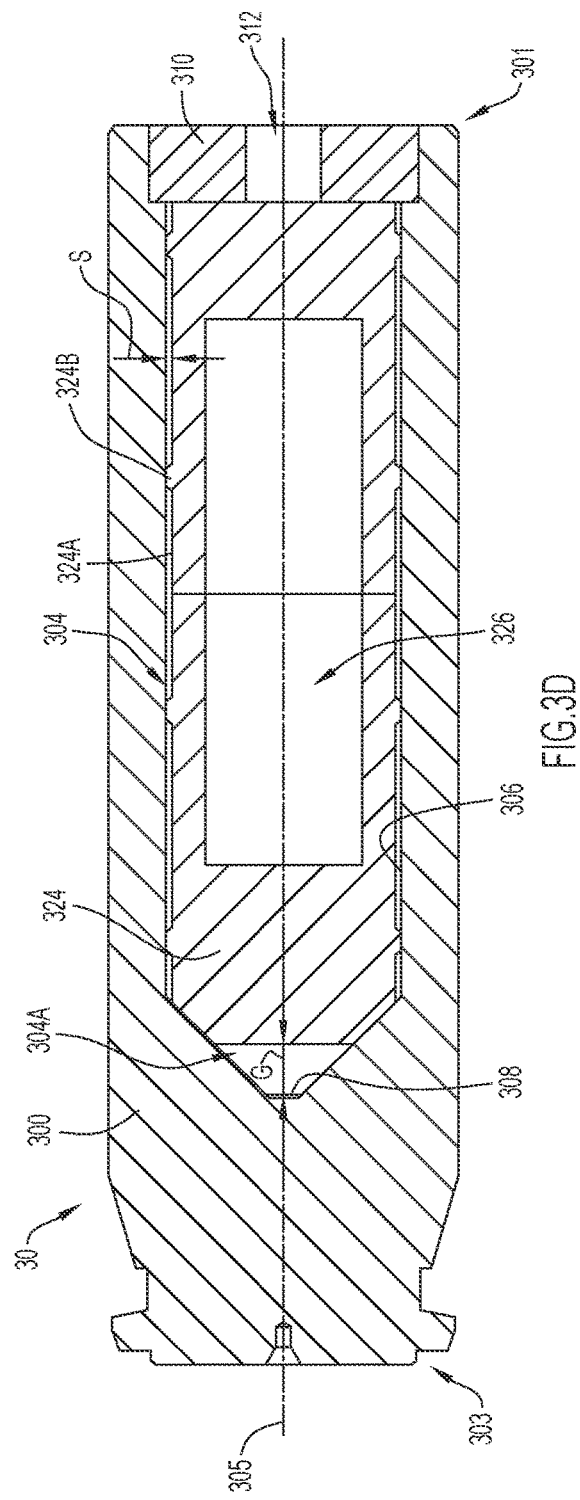

OPEN CHANNEL PLUNGER FOR FRACKING PUMPS

FIELD OF INVENTION

The present invention relates to the field of high pressure reciprocating pumps and, in particular, to a light-weight plunger for a fracking pump.

BACKGROUND

High pressure reciprocating pumps are often used to deliver high pressure fluids with proppant during earth drilling operations. Generally, a reciprocating pump includes a power end and a fluid end. The power end can generate forces sufficient to cause the fluid end to deliver high pressure fluids to earth drilling operations. In the fluid end, a reciprocating element (e.g., a plunger or a piston) pressurizes a working fluid, and one or more seals typically prevent, or at least discourage, leakage around the reciprocating element. For example, in a reciprocating pump intended for fracking operations (i.e., a frack pump), packing seals may provide a seal around a plunger to prevent fluid from leaking between the plunger and a bore within which the plunger is reciprocating. Typically, the plunger is solid and made from a strong, dense alloy to prevent deformation of the plunger when driving the high pressures in the fluid end. Thus, the plunger can be very heavy. Consequently, installing the heavy plunger into the fluid end may be difficult. Moreover, the heavy weight of the plunger causes a large amount of friction between the packing seals and the plunger, resulting in friction heating and wear of the plunger, and/or packing seal.

SUMMARY

The techniques presented herein provide a light-weight reciprocating element, or plunger, for a fracking pump that is resistant to deformation. The light-weight plunger reduces the load exerted by the plunger onto the seal/packing, and thus, the amount of friction between the plunger and the seal/packing. Consequently, a pump assembly with the light-weight plunger generates less heat and reduces wear of the seal/packing as compared to conventional solid steel plungers. According one embodiment, the techniques described herein relate to a reciprocating element for a pump including a body defining a cavity. The body has a closed distal end and an open proximal end opposite the closed distal end, and the body is configured to apply a pressure to a working fluid. The cavity extends from the open proximal end towards the closed distal end. The reciprocating element may include an insert disposed in the cavity, and the insert is configured to prevent debris from accumulating within the cavity.

In some instances, a reciprocating pump includes a power end, a fluid end coupled to the power end, and a reciprocating element. The power end is configured to generate pumping power. The fluid end is configured to deliver a fluid from an inlet bore, through a chamber, and to an outlet bore as the power end generates the pumping power. A reciprocating element configured to drive the fluid through the fluid end. The reciprocating element has an open proximal end and a closed distal end. The distal end is coupled to the power end and the proximal end is received in the fluid end. The reciprocating element defines a cavity extending from the proximal end to the distal end. An insert, disposed in the cavity, is configured to prevent debris from accumulating within the cavity.

In some aspects, the techniques described herein relate to a method including drawing, via a reciprocating element, a fluid from an inlet bore to a pumping chamber; guiding a portion of the fluid from the pumping chamber into a cavity of the reciprocating element; preventing debris from accumulating within the cavity via an insert; and driving, via the reciprocating element, the fluid to an outlet bore.

BRIEF DESCRIPTION OF THE DRAWINGS

To complete the description and in order to provide for a better understanding of the techniques presented in this application, a set of drawings is provided. The drawings form an integral part of the description and illustrate an embodiment of the present application, which should not be interpreted as restricting the scope of the present application, but just as an example of how the techniques presented herein can be carried out. The drawings comprise the following figures:

FIG. 3C is a cross-sectional view of a reciprocating element according to an embodiment.

FIG. 3D is a cross-sectional view of a reciprocating element according to an embodiment.

Like reference numerals have been used to identify like elements throughout this disclosure.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the present application is directed to a light-weight reciprocating element, or plunger, for a fracking pump with an open channel. That is, the reciprocating element includes a hollow portion or cavity that may receive a working fluid and/or an insert to prevent deformation of the reciprocating element during a pumping operation. The light-weight reciprocating element is easier to install in a fracking pump. Also, reducing the weight of the reciprocating element reduces the load applied to seals (e.g., packing) supporting the reciprocating element, and thus, reduces the amount of friction between the reciprocating element and seal/packing as compared to conventional, solid plungers. Consequently, the reciprocating element presented herein reduces friction heating of the reciprocating element and wear of the seal/packing as compared to conventional, solid plungers.

Figure 1:
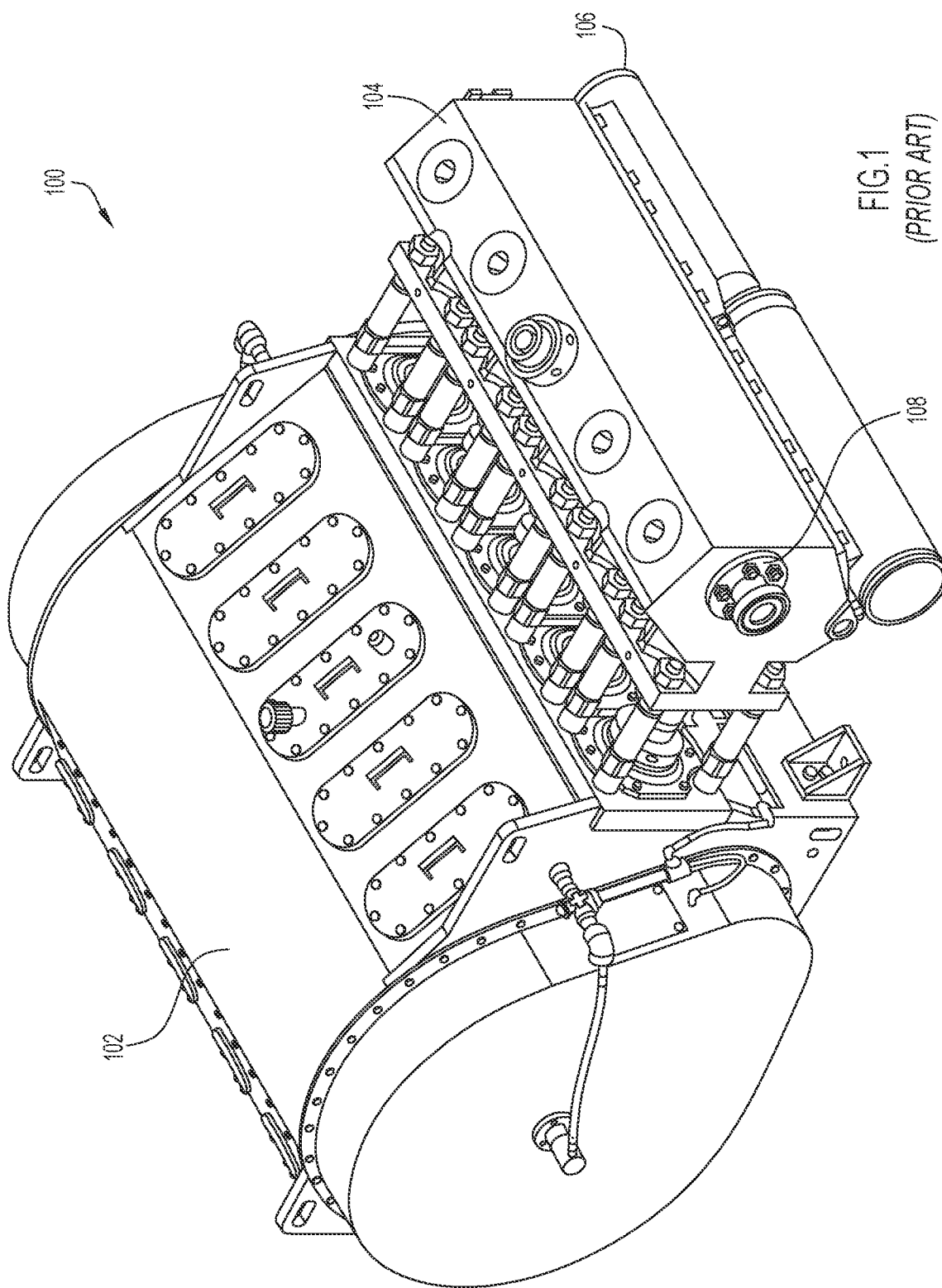
FIG. 1 is a front perspective view of a prior art reciprocating pump including a fluid end, a power end, and solid plunger.

Referring to FIG. 1, a prior art reciprocating pump 100 is illustrated. The reciprocating pump 100 includes a power end 102 and a fluid end 104. The power end 102 includes a crankshaft that drives a plurality of solid reciprocating plungers or pistons (generally referred to as "reciprocating elements") within the fluid end 104 to pump fluid at high pressure (e.g., to cause the fluid end 104 to deliver high pressure fluids to earth drilling operations). For example, the power end 102 may be configured to support hydraulic fracturing (i.e., fracking) operations, where fracking liquid (e.g., a mixture of water and proppant/sand) is injected into rock formations at high pressures to allow natural oil and gas to be extracted from the rock formations. However, to be clear, this example is not intended to be limiting and the present application may be applicable to both fracking and drilling operations. At the same time, the present invention may also offer some specific advantages for hydraulic fracturing, which may be noted herein where applicable.

In any case, often, the reciprocating pump 100 may be quite large and may, for example, be supported by a semitractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, extend the time between maintenance operations (i.e., between downtime), and/or minimize the time needed to complete maintenance operations (minimizing downtime) are highly desirable.

Figure 2:
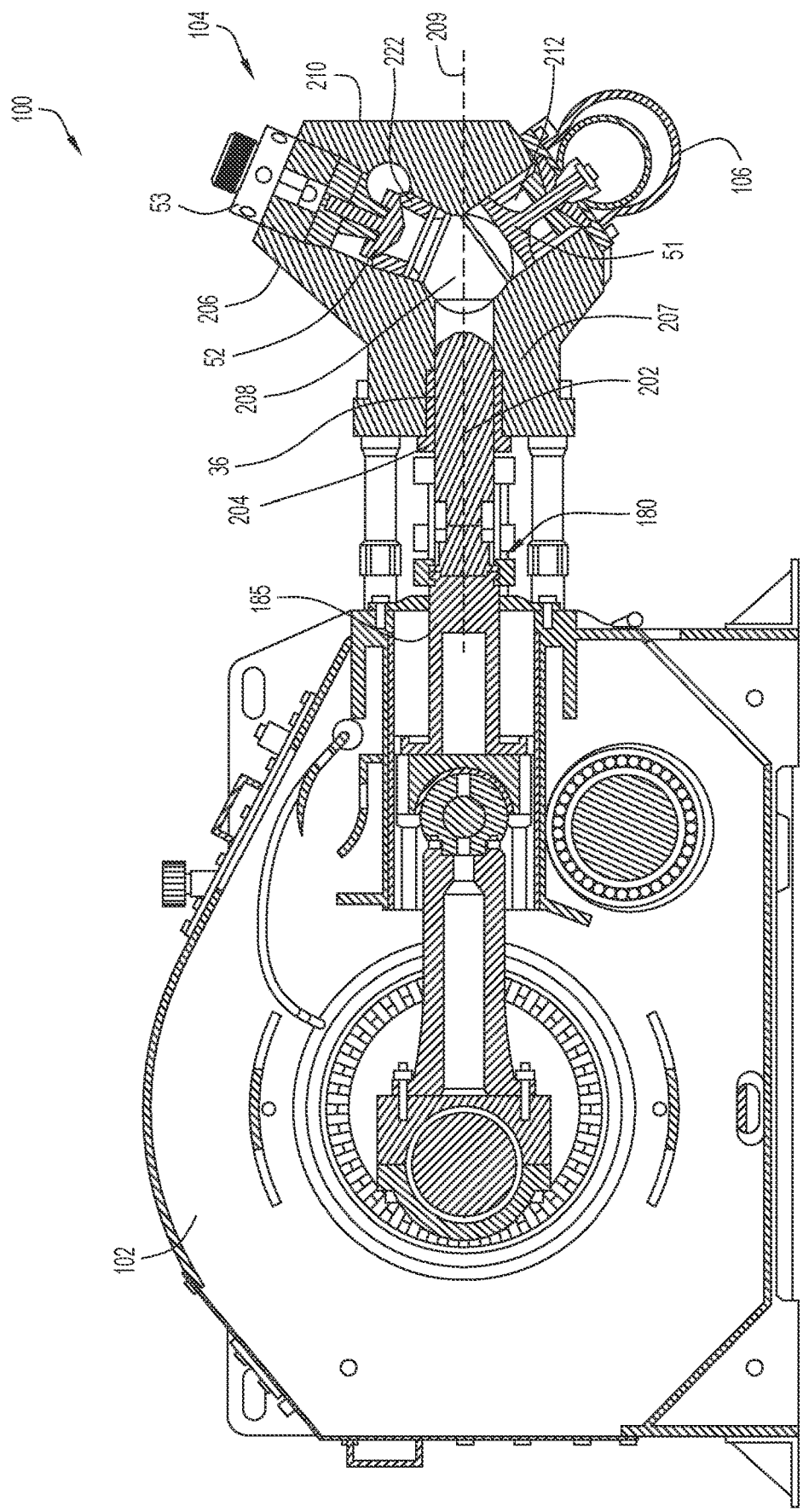
FIG. 2 is a side cross-sectional view of the prior art reciprocating pump of FIG. 1.

Still referring to FIG. 1, but now in combination with FIG. 2, the reciprocating pump 100 pumps fluid into and out of pumping chambers 208. FIG. 2 shows a side, cross-sectional view of reciprocating pump 100 taken along a central axis 209 of one of the solid reciprocating elements 202 coupled to a pony rod 185 included in reciprocating pump 100. Thus, FIG. 2 depicts a single pumping chamber 208. However, it should be understood that a fluid end 104 can include multiple pumping chambers 208 arranged side-by-side. In fact, in at least some embodiments (e.g., the embodiment of FIG. 1), a casing 206 of the fluid end 104 forms a plurality of pumping chambers 208 and each chamber 208 includes a solid reciprocating element 202 that reciprocates within the casing 206. However, side-by-side pumping chambers 208 need not be defined by a single casing 206. For example, in some embodiments, the fluid end 104 may be modular and different casing segments may house one or more pumping chambers 208. In any case, the one or more pumping chambers 208 are arranged side-by-side so that corresponding conduits are positioned adjacent each other and generate substantially parallel pumping action. Specifically, with each stroke of the reciprocating element 202, low pressure fluid is drawn into the pumping chamber 208 and high pressure fluid is discharged. But, often, the fluid within the pumping chamber 208 contains abrasive material (i.e., "debris," which may be or include proppant and/or solid contaminants) that can damage seals formed in the reciprocating pump 100, such as the "packing seals" surrounding a reciprocating element 202 of a fracking fluid end, creating a need for continued maintenance.

In various embodiments, the fluid end 104, and specifically the fluid end casing 206, may be shaped differently and/or have different features, but may still generally perform the same functions, define similar structures, and house similar components. For example, while fluid end 104 includes a first bore 204 that intersects an inlet bore 212 and an outlet bore 222 at skewed angles, other fluid ends may include any number of bores arranged along any desired angle or angles, for example, to intersect bore 204 (and/or an access bore) substantially orthogonally and/or so that two or more bores are substantially coaxial. Generally, bores 212 and 222, as well as any other bores (i.e., segments, conduits, etc.), may intersect to form a pumping chamber 208, may be cylindrical or non-cylindrical, and may define openings at an external surface 210 of the casing 206. Additionally, bores 212 and 222, as well as any other bores (i.e., segments, conduits, etc.), may receive various components or structures, such as sealing assemblies or components thereof.

In the depicted embodiment, inlet bore 212 defines a fluid path through the fluid end 104 that connects the pumping chamber to a piping system 106 delivering fluid to the fluid end 104. Meanwhile, outlet bore 222 allows compressed fluid to exit the fluid end 104. Thus, in operation, bores 212 and 222 may include valve components 51 and 52, respectively, (e.g., one-way valves) that allow bores 212 and 222 to selectively open and deliver a fluid through the fluid end 104. Typically, valve components 51 in the inlet bore 212 may be secured therein by a piping system 106 (see FIG. 1). Meanwhile valve components 52 in outlet bore 222 may be secured therein by a closure assembly 53 that, in the prior art example illustrated in FIG. 2, is removably coupled to the fluid end 104 via threads.

In operation, fluid may enter fluid end 104 via outer openings of inlet bores 212 and exit fluid end 104 via outer openings of outlet bores 222. More specifically, fluid may enter inlet bores 212 via pipes of piping system 106, flow through pumping chamber 208 (due to reciprocation of a reciprocating elements 202), and then flow through outlet bores 222 into a channel 108 (see FIG. 1). However, piping system 106 and channel 108 are merely example conduits and, in various embodiments, fluid end 104 may receive and discharge fluid via any number of pipes and/or conduits, along pathways of any desirable size or shape.

Meanwhile, each of bores 204 defines, at least in part, a cylinder for reciprocating elements 202, and/or connects the casing 206 to a cylinder for reciprocating elements 202. More specifically, in the illustrated embodiment, a casing segment 207 houses a packing assembly 36 configured to seal against a reciprocating element 202 disposed interiorly of the packing assembly 36 and prevent fluid from leaking through reciprocation bore 204. Reciprocation of a reciprocating element 202 in or adjacent to bore 204, which may be referred to as a reciprocation bore (or, for fracking applications, a plunger bore), draws fluid into the pumping chamber 208 via inlet bore 212 and pumps the fluid out of the pumping chamber 208 via outlet bore 222. During operation, friction between the solid reciprocating elements 202 and the packing assembly 36 generates heat that is absorbed by the reciprocating element 202.

Over time, the packing assembly 36 will wear and/or fail due to friction from the heavy, solid reciprocating element 202 and debris, such as proppant, in the working fluid, and thus, must be accessed for maintenance and/or replacement. Reducing the weight of the reciprocating element 202 decreases the amount of friction and heat generated and thus reduces the wear of the packing assembly 36. Consequently, the life of the packing assembly 36 and reciprocating element may be extended. That is, the time between maintenance operations of the packing assembly 36 and reciprocating element may be extended.

In addition to the packing assembly 36 and reciprocating element 202, other components, such as valve components 51 and/or 52, or the fluid end casing 206 itself may also wear and/or fail and require repair or replacement over time.

Reducing the amount of heat generated and retained by the reciprocating element 202 may also extend the life of the other components adjacent to the reciprocating element. In any case, to help provide access to these parts and/or the pumping chamber when they fail, some fluid ends have access bores that are often aligned with (and sometimes coaxial with) the reciprocating bore 204. Other fluid ends need not include access bores and, thus, such an access bore is not illustrated in FIGS. 1 and 2.

Referring to FIGS. 3A-3D, light-weight reciprocating elements 30 according to exemplary embodiments are illustrated. Like reference numerals have been used to identify like elements throughout these figures. The reciprocating elements 30 may replace the reciprocating element 202 and be installed in the reciprocating pump 100 of FIGS. 1 and 2 to reduce wear and extend the time between maintenance operations of the reciprocating pump 100, but could also replace any other reciprocating element for a high pressure reciprocating pump of any shape or size.

Figure 3A:
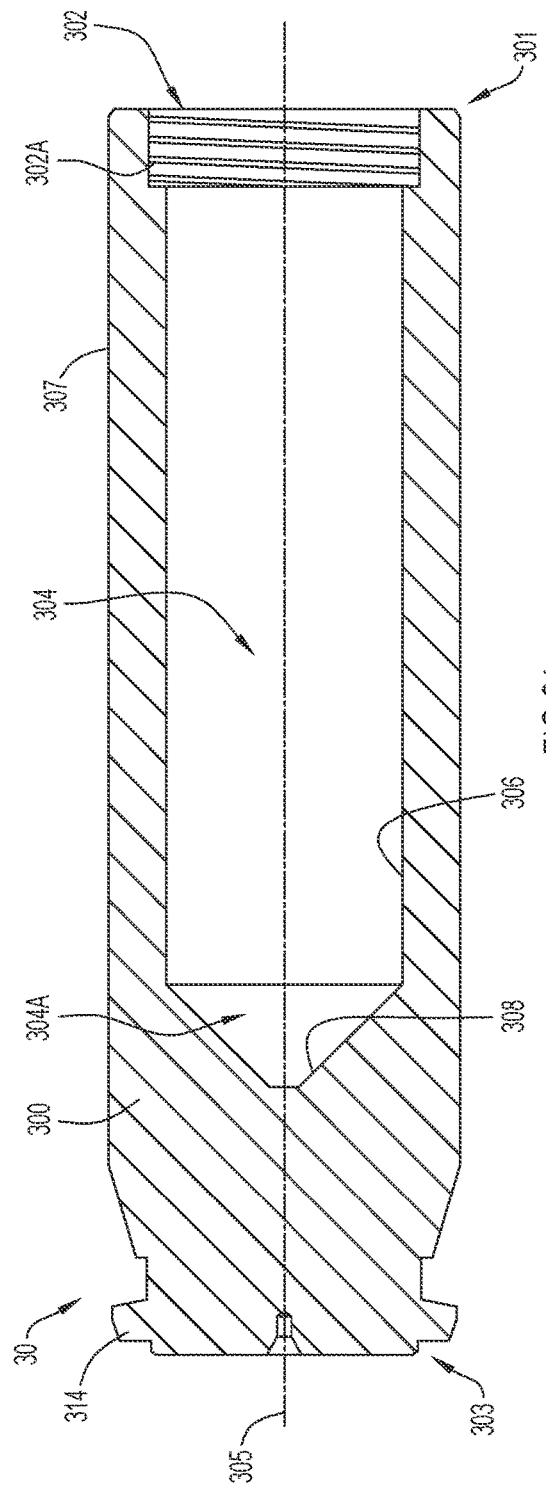
FIG. 3A is a cross-sectional view of a reciprocating element according to an embodiment.

As illustrated in FIG. 3A, the reciprocating element 30, or plunger, includes a cylindrical, elongated body 300 extending along a central axis 305 from a proximal end 301 to a closed distal end 303 opposite the proximal end 301. That is, no fluid from the proximal end 301 may flow past the closed distal end. The distal end 303 may be coupled to a pony rod 185, for example, by connecting a radial protrusion or lug 314 extending from an outer surface 307 of the elongated body 300 to the pony rod 185 with a clamp 180 (see FIG. 2). At the other end, the proximal end 301 defines an opening 302 to a channel or cavity 304 extending from the opening 302 towards the distal end 303.

In the depicted embodiments, the cavity 304 extends through about 75% (e.g., 65-85%) of the length of the elongated body 300. However, other embodiments might include a cavity 304 that extends through any portion of an elongated body. In any case, an annular inner wall 306 and a distal end wall 308 of the elongated body 300 may define the cavity 304. The distal end wall 308 may be angled, or tapered, with respect to the central axis 305 to define a frustoconical portion 304A of the cavity 304 (discussed in further detail below). In some implementations, the cavity 304 may have a diameter that is greater than half of a diameter of the elongated body 300. For example, in some instances, the diameter of the cavity 304 may be about 75% the diameter of the elongated body 300. Regardless of the ratio between the diameters of the cavity 304 and the elongated body 300, the thickness between the inner wall 306 and the outer surface 307 may be determined based on the operating pressures of the reciprocating pump 100 and material properties of the reciprocating element 30.

Overall, the cavity 304 reduces the weight of the reciprocating element 30 thereby reducing the friction generated between the elongated body 300 and a seal, such as a packing seal. Moreover, the cavity 304 reduces the thermal mass of the elongated body 300 as compared to the conventional, solid reciprocating element 202, easing the detrimental effects of heating that occur during reciprocating motion. Meanwhile, the opening 302 guides the high pressure fluid to the cavity 304 to reinforce the elongated body 300 such that the reciprocating element 30 can withstand the high pressures generated by the reciprocating pump 100, as is explained in further detail below. Thus, the reciprocating element 30 may be used in high pressure pumping operations while retaining less heat and reducing wear of pump components as compared to the conventional reciprocating element 202.

During operation, the reciprocating element 30 pressurizes the working fluid in the pumping chamber 208 (see FIG. 2) to a very high pressure (e.g., between 1,500 to 15,000 PSI or 10.3 MPa to 103 MPa). The high operating pressure of the reciprocating pump 100 could potentially damage or otherwise deform the hollow reciprocating element 30. For example, the forces transmitted by the reciprocating element 30 to a working fluid in the pumping chamber 208 may generate a bending moment and/or shearing force greater than the maximum stress and/or strain limits of the hallow elongated body 300. To counter the bending moment and/or shearing force, the high pressure fluid may enter the cavity 304 and reinforce the elongated body 300 from the inside. That is, a portion of the pressurized fluid may enter and exit the cavity 304 to equalize the load, pressure, and/or forces acting on the elongated body 300 between the inside and outside portions of the reciprocating element 30. For example, the fluid may enter the cavity 304 and apply pressure to the annular inner wall 306 and distal end wall 308 which may transmit forces from the applied pressure through the elongated body 300. The transmitted forces may counter, reduce, or resist, any bending moment/torque, stress/strain, and/or shear force of the elongated body 300 generated during operation of the reciprocating pump 100. Reducing or resisting the bending moment and/or the shearing force may prevent deformation of the elongated body 300.

Figure 3B:
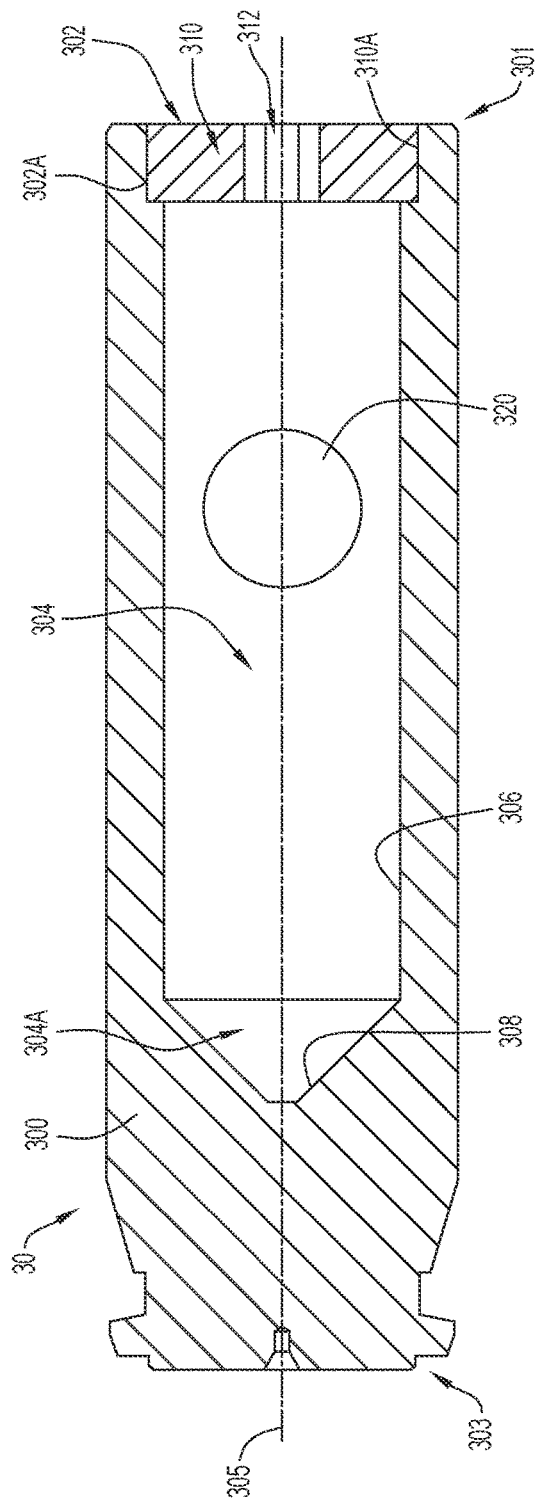
FIG. 3B is a cross-sectional view of a reciprocating element according to an embodiment.

Although not shown in FIG. 3A, in some implementations, the elongated body 300 may include a cap or retainer 310 disposed in the opening 302 (see FIGS. 3B-3D). The retainer 310 includes a through-hole 312 to provide access, or guide fluid, to the cavity 304 of the elongated body 300. The retainer 310 may have a threaded outer surface 310A that engages a threaded surface 302A of the opening 302. However, threading is only one example of how the retainer 310 may be coupled to the body 300 and, in other embodiments, the retainer 310 can be secured to the body 300 in any manner, removably or irremovably, provided that the coupling is strong enough to resist internal pressures created by fluid in cavity 304. For example, in some instances, the retainer 310 can be irremovably coupled to the body 300 via welding or by forming the retainer integrally with the body 300.

However, allowing working fluid inside cavity 304 inside the reciprocating element 30 can potentially be problematic in fracking or drilling operations. For example, in a fracking operation, the working fluid often includes debris, such as a proppant (e.g., sand, grit, and/or other solid material). This debris may accumulate in the cavity 304 which may negatively impact the operation of the reciprocating element 30. In some instances, the frustoconical portion 304A defined by the distal end wall 308 may assist in agitating the debris and the working fluid to prevent buildup in the cavity 304. This is at least partially because the frustoconical portion 304A eliminates sharp corners and creates a relatively smooth path along which debris might travel at the distal wall 308 and/or from which debris might be agitated by fluid flow. Nevertheless, in some implementations, an insert may be disposed within the cavity 304 to further prevent the debris (e.g., proppant) from accumulating within the cavity 304.

FIGS. 3B-3D illustrate three example inserts that can discourage debris (e.g., proppant) from accumulating within the cavity 304. First, referring to FIG. 3B, an insert 320, or agitator, according to an embodiment, is illustrated. The insert 320 is disposed in the cavity 304 and can move freely within the cavity 304. But a cap or retainer 310 is disposed in the opening 302 of the elongated body 300 to retain the insert 320 within the elongated body 300. At the same time, the retainer 310 allows the working fluid and debris (e.g., proppant) to enter and exit the cavity 304. For example, the through-hole 312 allows the working fluid with debris from the pumping chamber 208 to enter and exit the cavity 304 in response to the reciprocating motion of the elongated body 300. As mentioned, in the depicted embodiment, the outer surface 310A of the retainer 310 is threaded and removably engages a threaded surface 302A (see also FIG. 3A) of the opening 302.

When the insert 320 is retained and free to move in the cavity 304, the reciprocating motion of the elongated body 300 causes the insert 320 to move within the cavity 304. For example, reciprocating motion of the elongated body 300 may cause the inset 320 to shake back in forth in the cavity 304, e.g., by alternatively hitting the retainer 310 and the distal end wall 308. This movement will agitate the working fluid and any debris (e.g., proppant) disposed in the cavity 304, preventing build up of debris (e.g., proppant) within the cavity 304 by constantly mixing the fluid and debris. Thus, both the debris and working fluid may enter and exit the cavity 304 from the through-hole 312 (instead of fluid and debris entering while only fluid exits).

Moreover, the exchange of the working fluid between the cavity 304 and pumping chamber 208 may facilitate the cooling of the interior surface of the elongated body 300. This is because the working fluid may absorb heat from the elongated body 300 when contacting the internal surfaces defining the cavity 304 and the absorbed heat may exit the cavity 304 with the working fluid. That is, as working fluid enters and exits the cavity 304, it absorbs and removes heat from the elongated body 300. Consequently, the exchange of working fluid may cool the elongated body.

In the depicted embodiment, the insert 320 is a ball or sphere. However, the insert 320 may be any shape or size to facilitate agitation of a desired fluid and/or debris. For example, the insert 320 may be a triangular/square pyramid, cylinder, cube, rectangular prism, cone, star polyhedron, or other polyhedron. In some instances, two or more inserts 320 of the same and/or different shapes and/or sizes may be disposed within the elongated body 300 to agitate the working fluid and debris (e.g. proppant) and prevent build up of debris in the cavity 304.

Now referring to FIG. 3C, in some instances, the reciprocating element 30 includes an insert 322 that substantially fills the cavity 304 to prevent entrapment of air, fluid, and debris within the cavity 304. That is, the insert 322 can fill approximately 90% to 100% of the volume of the cavity 304. Alternatively, in some implementations, the insert 322 fills approximately 80% or more of the volume of the cavity 304. In any case, the insert 322 may be made of a lighter material than that of the elongated body 300. For example, the insert 322 may comprise rubber, urethane, other polymer(s), and/or combinations thereof. Meanwhile, the elongated body 300 may comprise a metal such as steel, tungsten, nickel, titanium, other high metal and/or combinations/alloys thereof.

Insert 322 may also reinforce the elongated body 300. This is because, during operation, the insert 322 may apply forces to the inner wall 306 and distal end wall 308 to resist, or counter, any bending moment/torque, stress/strain, and/or shear force applied to the elongated body 300 during operation of the reciprocating pump 100. In some implementations, working fluid may enter the through-hole 312 in the retainer 310 and transmit pressure to the insert 322. In response, the insert 322 may resiliently compress and transmit the pressure to the inner wall 306 and distal end wall 308 of the elongated body 300. But, at the same time, the insert 322 may seal an inner end of through-hole 312 so that fluid and debris cannot flow around the insert 322 and degrade the insert 322. Regardless of whether the working fluid enters the through-hole 312, the insert 322 reinforces the elongated body 300 and prevents the build up of debris within the cavity 304.

Now referring to FIG. 3D, the reciprocating element 30 is illustrated while including an insert 324 according to another embodiment. The insert 324 (like insert 322) substantially spans the cavity 304 to prevent entrapment of air, fluid, and debris (e.g., proppant) within the cavity 304. That is, the insert 324 spans approximately 90% or more of the volume of the cavity 304. Alternatively, the insert 324 can span approximately 80% of the volume of the cavity 304. However, to be clear, insert 324 need not fill this volume because insert 324 may be include an internal cavity and/or be hollow. By comparison, insert 322 spans a volume of cavity 304 while also filling this volume (since insert 322 is solid or complete, not hollow or open). That aside, the insert 324 may also be made of a lighter material than that of the elongated body 300. For example, the insert 324 may comprise a resilient material such as rubber, urethane, other polymer(s), and/or combinations thereof, meanwhile, the elongated body 300 may comprise a metal such as steel, tungsten, nickel, titanium, other metals and/or combinations/alloys thereof.

The insert 324 also reinforces the elongated body 300 and dampens pulsations or vibrations from the pumping operation (e.g., of pump 100). The reinforcement is achieved for substantially similar reasons as insert 322 (e.g., since insert 324 spans a significant volume of cavity 304). The dampening is achieved because insert 324 absorbs and prevents the pulsations and/or vibrations from propagating through the elongated body 300. For example, the insert 324 may receive and dissipate vibrations from the elongated body 300 and/or pulsations from the working fluid by expanding and/or compressing/contracting within the cavity 304.

More specifically, in at least some embodiments, this vibration dampening is achieved because the insert 324 includes an internal, second cavity 326, an outer surface 324A and four protrusions 324B extending radially from the outer surface 324A. The protrusions 324B engage the inner wall 306, receive vibrations from the elongated body 300, and maintain a space S between the outer surface 324A and the inner wall 306. When the insert 324 is disposed in the cavity 304, a gap G is formed between the distal end wall 308 and the insert 324. The second cavity 326, the space S, and the gap G each provide an open volume for the insert 324 to resiliently expand and/or compress with little or no contact between the outer surface 324A and the elongated body 300. Consequently, the vibrations from the elongated body 300 and/or pulsations from the working fluid are absorbed and/or dissipated by the resilient response of the insert 324 within the open volumes. Accordingly, the insert 324 dampens pulsations and/or vibrations associated with operation of the reciprocating pump 100.

To be clear, the insert 324 is merely one example of an insert that may dampen vibrations and one or more features of insert 324 may be used in other embodiments to dampen vibrations. For example, in some instances, the insert 324 may have more than four or less than four protrusions 324B. That is, the insert 324 may have any number of protrusions to maintain the space S between the inner wall 306 and the outer surface 324A. Additionally or alternatively, an insert 324 of different size or shape may have protrusions that allow for resilient expansion and/or compression. For example, insert 322 and/or 324 might include protrusions that space insert 322 from the inner wall 306 of body 300 and allow for resilient expansion and/or compression with respect to the inner wall 306 (perhaps without creating a gap G between the distal end wall 308 and the insert 322). Or, insert 322 and/or 324 might include protrusions that space insert 322 from distal wall 308 and allow for resilient expansion and/or compression with respect to the distal wall 308 (perhaps without creating a space S between the inner wall 306 and the insert 322). That is, different embodiments need not include a second cavity 326, define a gap G, and define a space S and, instead, might include any subset of these features to achieve at least some vibration dampening.

Still further, cavity 304 and/or cavity 326 might vary as compared to those shown. For example, insert 324 might achieve vibration dampening in a cavity 304 without a frustoconical portion 304A. Additionally or alternatively, second cavity 326 might be enclosed in some embodiments, but might also achieve at least some vibration dampening when only partially enclosed (e.g., when it includes one or more openings or holes). The second cavity 326 might also have various shapes, include one or more connected and/or disparate compartments (similar to a ballast), or include any other variations in shape, size, or configuration.

Figure 4:
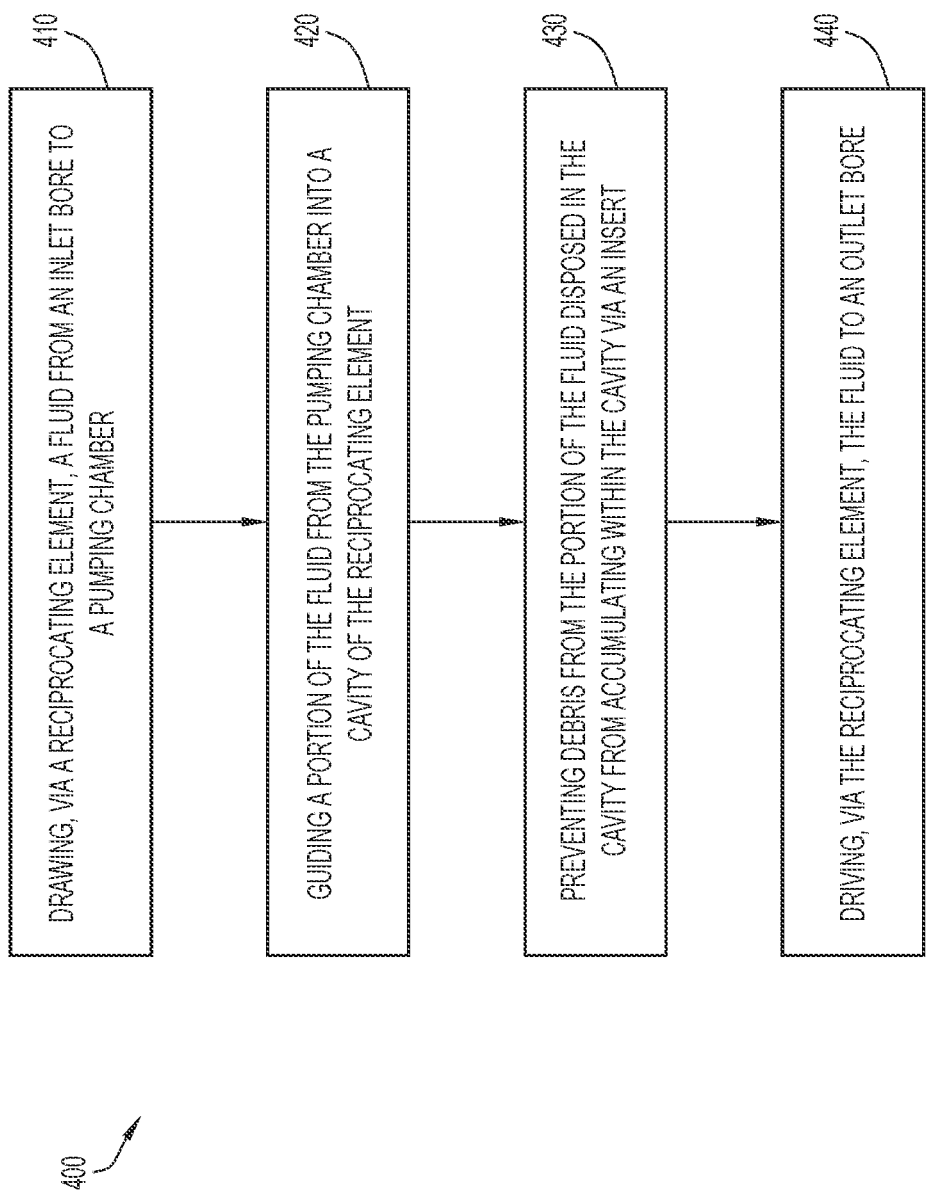
FIG. 4 is a method according to an embodiment.

Now referring to FIG. 4, a method 400 of reinforcing a reciprocating element is depicted according to an exemplary embodiment. The method may be carried out by the reciprocating pump 100 and reciprocating element 30 of FIGS. 1, 2, and 3A-3D. The method includes drawing, via a reciprocating element, a fluid from an inlet bore to a pumping chamber in operation 410, guiding a portion of the fluid from the pumping chamber into a cavity of the reciprocating element in operation 420, preventing debris from the portion of the fluid disposed in the cavity accumulating within the cavity via an insert in operation 430, and driving, via the reciprocating element, the fluid to an outlet bore in operation 440. In some implementations, the fluid in the cavity reinforces the reciprocating element, and the fluid enters and exits the cavity via a through-hole in a retainer. In some instances, preventing debris from accumulating within the cavity further includes agitating the fluid disposed in the cavity via the insert to mix the debris with the fluid. In yet another implementation, the method may further include dissipating or absorbing pulsations and vibrations from a pumping operation via an insert disposed in the cavity.

The techniques presented herein provide a light-weight reciprocating element 30 that reduces the friction applied to the seals/packing of the fluid end 104 thereby reducing wear and heat generation as compared to the conventional, solid reciprocating element 202. Consequently, the reciprocating element 30 may extend the life of the seals/packing and other pumping components to thereby extend the time between maintenance operations of the reciprocating pump 100.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the insert 320, 322, and 324 described herein, or portions thereof, may be fabricated from any suitable material or combination of materials, such as plastic, foamed plastic, metal, supple natural or synthetic materials including, but not limited to, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc., the phrase "between X and Y" represents a range that includes X and Y.

For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity and does not in itself dictate a relationship between the various embodiments and/or configurations discussed.

Similarly, when used herein, the term "comprises" and its derivations (such as "comprising," etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

As used herein, unless expressly stated to the contrary, use of the phrase "at least one of," "one or more of," "and/or," variations thereof, or the like are open-ended expressions that are both conjunctive and disjunctive in operation for any and all possible combination of the associated listed items. For example, each of the expressions "at least one of X, Y and Z," "at least one of X, Y or Z," "one or more of X, Y and Z," "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms "first," "second," "third," etc., are intended to distinguish the particular nouns they modify (e.g., element, condition, node, outlet, inlet, valve, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

The invention claimed is:

1. A lightweight reciprocating plunger for a high pressure pump comprising:
    a plunger body defining a cavity, the plunger body having a closed distal end and an open proximal end opposite the closed distal end, wherein the plunger body is configured to reciprocate within and with respect to one or more packing seals to apply a pressure to a working fluid in a fluid end of the high pressure pump, wherein the cavity extends from the open proximal end towards the closed distal end; and
    an insert disposed in the cavity, wherein the insert comprises an agitator configured to move freely within the cavity to prevent debris from accumulating within the cavity.

2. The lightweight reciprocating plunger of claim 1, wherein the plunger body defining the cavity further comprises a distal wall opposite the open proximal end, wherein the distal wall defines the closed distal end, and the plunger body is configured to receive a portion of the working fluid within the cavity.

3. The lightweight reciprocating plunger of claim 1, wherein the insert partially fills the cavity.

4. The lightweight reciprocating plunger of claim 1, wherein the plunger body comprises a first material and the insert comprises a second material lighter than the first material.

5. The lightweight reciprocating plunger of claim 1, wherein the insert defines a second cavity.

6. The lightweight reciprocating plunger of claim 5, wherein the second cavity is an enclosed cavity.

7. The lightweight reciprocating plunger of claim 1, further comprising a retainer having a through-hole, the retainer disposed at the proximal end.

8. The lightweight reciprocating plunger of claim 1, wherein the plunger body comprises a single piece, cylindrical, elongated body.

9. A reciprocating pump, comprising:
    a power end configured to generate pumping power;
    a fluid end coupled to the power end, the fluid end configured to deliver a fluid from an inlet bore, through a chamber, and to an outlet bore as the power end generates the pumping power;
    a lightweight reciprocating plunger configured to drive the fluid through the fluid end, the lightweight reciprocating plunger having an open proximal end and a closed distal end, the distal end coupled to the power end and the proximal end received in the fluid end, the lightweight reciprocating plunger defining a cavity extending from the proximal end to the distal end; and
    an insert disposed in the cavity, wherein the insert comprises an agitator configured to move freely within the cavity to prevent debris from accumulating within the cavity.

10. The reciprocating pump of claim 9, wherein the lightweight reciprocating plunger further comprises a distal wall opposite the open proximal end, wherein the distal wall defines the closed distal end, and the lightweight reciprocating plunger is configured to receive a portion of the fluid within the cavity.

11. The reciprocating pump of claim 9, wherein the lightweight reciprocating plunger comprises a first material and the insert comprises a second material lighter than the first material.

12. The reciprocating pump of claim 9, wherein the insert defines an enclosed cavity.

13. The reciprocating pump of claim 9, wherein the lightweight reciprocating plunger further comprises a retainer having a through-hole, the retainer disposed at the proximal end of the lightweight reciprocating plunger.

14. The reciprocating pump of claim 9, wherein a plunger body of the lightweight reciprocating plunger comprises a single piece, cylindrical, elongated body.

15. A method comprising:
    drawing, via a lightweight reciprocating plunger, a fluid from an inlet bore to a pumping chamber;
    guiding a portion of the fluid from the pumping chamber into a cavity of the lightweight reciprocating plunger;
    preventing debris from the portion of the fluid disposed in the cavity from accumulating within the cavity via an insert by agitating the fluid disposed in the cavity via the insert to mix the debris with the fluid, wherein the insert comprises an agitator configured to move freely within the cavity; and
    driving, via the lightweight reciprocating plunger, the fluid to an outlet bore.

16. The method of claim 15, wherein the fluid enters and exits the lightweight reciprocating plunger via a through-hole in a retainer.

17. The method of claim 15, wherein the cavity of the lightweight reciprocating plunger is defined by a plunger body comprising a single piece, cylindrical, elongated body.

* * * * *